D. W. WILT.
TIRE DEVICE.
APPLICATION FILED JUNE 7, 1911.
1,010,560.
Patented Dec. 5, 1911.
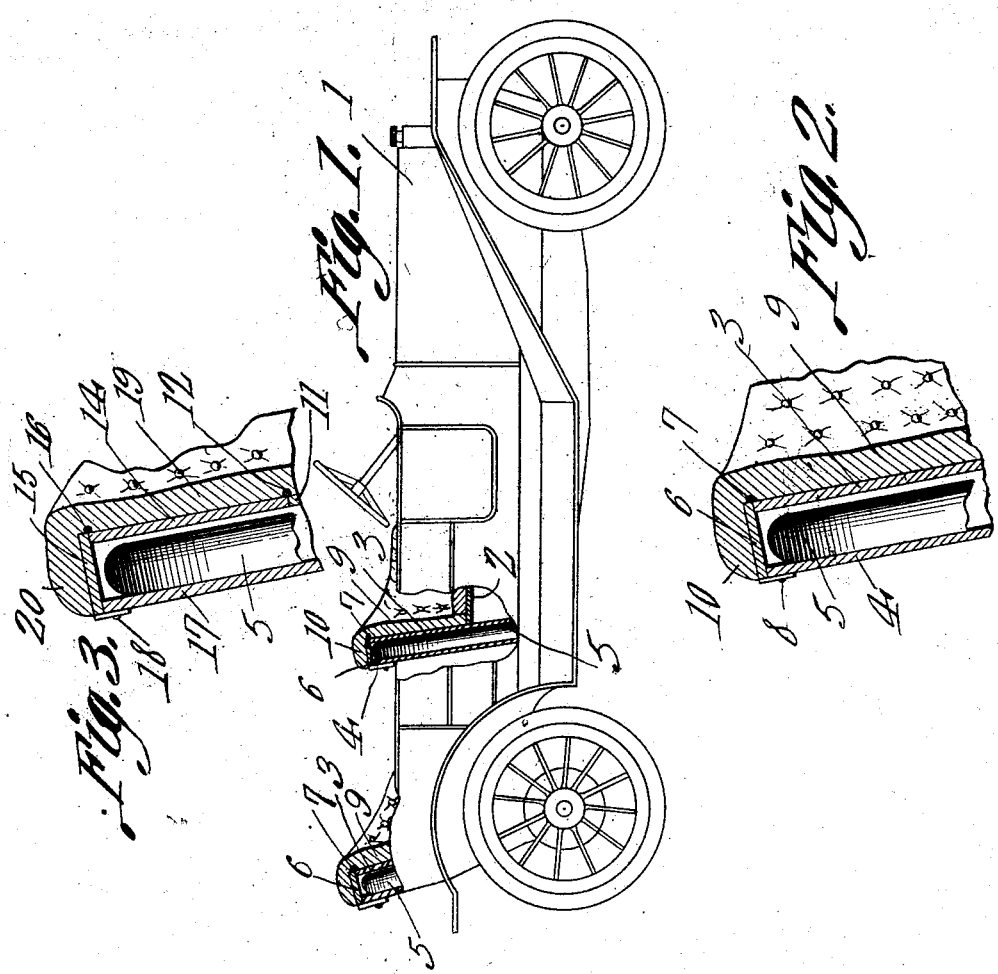
Witnesses
Inventor
D. W. Wilt,
by
Attorneys

UNITED STATES PATENT OFFICE.

DORAH W. WILT, OF UNIVERSITY PLACE, NEBRASKA.

TIRE DEVICE.

1,010,560.  Specification of Letters Patent.  Patented Dec. 5, 1911.

Application filed June 7, 1911. Serial No. 631,827.

*To all whom it may concern:*

Be it known that I, DORAH W. WILT, a citizen of the United States, residing at University Place, in the county of Lancaster and State of Nebraska, have invented a new and useful Tire Device, of which the following is a specification.

It is the object of the present invention to provide a vehicle having one or more novel and accessible receptacles, in which may be deposited, tires, rims and the like.

A further object of the invention is to provide, in a vehicle, one or more receptacles of this character, which may readily be opened, to permit the insertion and removal of tires, rims and the like.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 is a sectional side elevation of a vehicle equipped with the device of the present invention. Fig. 2 is an enlarged detail of Fig. 1; and Fig. 3 is a sectional elevation showing a modified form of the invention.

In the accompanying drawings, the numeral 1 denotes generally, a vehicle of the motor propelled type, provided with a seat 2, the back of the seat being denoted by the numeral 3. Disposed parallel to the back of the seat 3, is a plate 4, defining a compartment in which may be deposited one or more tires 5, to be used in case of accident; together with the rims and the like. The compartment is closed by a lid 6, hinged to the back 3, as shown at 7, the lid 6 being connected with the plate 4 by means of a suitable locking device of any sort, indicated at 8. The upholstering 9 of the back of the seat, is carried across the top of the lid, as shown at 10, so as to prevent any unsightly appearance, due to the presence of the tire holding receptacle. Moreover this portion 10 of the upholstering, serves to maintain the lid 6 in closed position.

In that form of the invention which is shown in Fig. 3, the back of the seat consists of a fixed section 11, to which is hinged at 12, a forwardly movable section 14, the lid 15 being hinged to the back section 14, as shown at 16. Disposed parallel to the back portions 11 and 14, is a plate 17, defining the receptacle in which the tire 7 is placed as before. The lid 15 may be maintained in closed position by a locking device 18 of any desired construction. The upholstering of the back, denoted by the numeral 19, is carried across the top of the lid 15 as shown at 20.

From the foregoing it will be seen that I have devised a vehicle having one or more accessible receptacles, adapted to hold tires and the like, the unsightly and obstructive tires which are at present carried along the sides of the vehicle, or elsewhere, in exposed positions, being done away with. The appearance of the vehicle is not only enhanced, by the use of the present invention, but, at the same time, the tires are protected more adequately.

In Fig. 1 of the drawings, both seats are shown as being provided with receptacles. It is to be understood that either seat may be provided with a receptacle, the other seat being without such receptacle; where there are several seats, ordinarily the back seat only, will be provided with the receptacle, although the number and location of the receptacles, is a matter which may be left to the choice of the manufacturer of the vehicle.

Having thus described the invention, what is claimed is:—

The combination with a wheel-mounted vehicle having a seat including a back the back including a movable section which may be tilted forwardly, of a plate spaced from the back, a lid hinged to the movable portion of the back and coöperating with the plate, and upholstering for the seat, the upholstering being carried rearwardly across the lid.

In testimony that I claim the foregoing as my own, I have hereto affixed my signature in the presence of two witnesses.

DORAH W. WILT.

Witnesses:
A. C. HILL,
L. S. BIDDLECOM.